United States Patent [19]
Akamatsu

[11] Patent Number: 5,177,157
[45] Date of Patent: Jan. 5, 1993

[54] PROCESS FOR PREPARING A SILICONE RESIN-MODIFIED PHENOLIC RESIN

[75] Inventor: Shoji Akamatsu, Chiba, Japan

[73] Assignee: Dow Corning Toray Silicone Co., Ltd., Tokyo, Japan

[21] Appl. No.: 571,964

[22] Filed: Aug. 23, 1990

[30] Foreign Application Priority Data

Aug. 31, 1989 [JP] Japan ................... 1-225231

[51] Int. Cl.$^5$ .................. C08F 283/12; C08G 77/04; C08G 8/10
[52] U.S. Cl. .................................. 525/398; 525/474; 525/485; 525/487
[58] Field of Search ............... 525/487, 398, 474, 485, 525/487

[56] References Cited

U.S. PATENT DOCUMENTS

| | | | |
|---|---|---|---|
| 4,022,753 | 5/1971 | Lohse et al. | 260/46.5 R |
| 4,474,930 | 10/1984 | Mikami et al. | 525/507 |
| 4,657,951 | 4/1987 | Takarada et al. | 523/153 |
| 4,808,483 | 2/1989 | Nakasuji et al. | 428/448 |

FOREIGN PATENT DOCUMENTS 2546895 12/1984 France.

OTHER PUBLICATIONS

W. Noll, Chemistry and Technology of Silicones (1968), pp. 197 and 371.

*Primary Examiner*—James J. Seidleck
*Assistant Examiner*—W. R. H. Clark
*Attorney, Agent, or Firm*—Alexander Weitz

[57] ABSTRACT

A two-step process for the preparation of a silicone resin-modified phenolic resin is disclosed wherein an alkoxysilane-modified phenolic resin is first prepared by reacting an alkoxysilane with a phenolic resin. In a subsequent step, the alkoxysilane-modified phenolic resin is hydrolyzed and condensed by heating and stirring it with water. The resulting silicone resin-modified phenolic resin, which is free of diorganopolysiloxane units, has excellent heat resistance and excellent electrical insulating properties.

5 Claims, No Drawings

PROCESS FOR PREPARING A SILICONE RESIN-MODIFIED PHENOLIC RESIN

The present invention relates to a process for the preparation of a silicone resin-modified phenolic resin. More particularly, the invention relates to a process for the preparation of silicone resin-modified phenolic resin from an alkoxysilane and a phenolic resin.

BACKGROUND OF THE INVENTION

There have already been numerous reports of siliconemodified phenolic resins and methods for their preparation. For example, Japanese Patent Application Laid Open [Kokai] Number 50-129699 [129,699/75] discloses a method in which phenolic resin and straight-chain organopolysiloxane having the alkoxy group at both molecular chain terminals are condensation reacted by heating. Otherwise, Japanese Patent Application Laid Open Number 61-192711 [192,711/86] discloses a method in which phenolic resin is condensation reacted by heating with organopolysiloxane resin having the alkoxy group or hydroxyl group at the molecular chain terminals.

However, these prior methods suffer from production problems. For example, due to the use of organopolysiloxane which in all cases is incompatible with the starting phenolic resin, the condensation reaction rate is slow, and long periods of time are thus required to obtain the silicone-modified phenolic resin. Moreover, the silicone-modified phenolic resins afforded by these methods have an unsatisfactory heat resistance because they inevitably contain the straight-chain diorganopolysiloxane unit, and this restricts their application.

SUMMARY OF THE INVENTION

The present invention was achieved by the present inventor as the result of investigations directed at solving the aforementioned problems.

The present invention takes as its object the introduction of a highly productive method for the preparation of a silicone resin-modified phenolic resin which is free of the diorganopolysiloxane unit. The invention therefore relates to a process for preparing a silicone resin-modified phenolic resin comprising:
(I) reacting
  (a) an alkoxysilane having the general formula $$R^1Si(OR^2)_3$$

wherein $R^1$ is selected from the group consisting of a monovalent hydrocarbon group and a substituted monovalent hydrocarbon group and $R^2$ is an alkyl group having 1 to 3 carbon atoms, with (b) a phenolic resin, to form an alkoxysilane-modified phenolic resin, the proportions being such that the ratio of the number of equivalents of alkoxy groups in component (a) to the number of equivalents of phenolic hydroxyl groups in component (b) is at least 1; and
(II) heating and stirring a mixture comprising water and said alkoxysilane-modified phenolic resin from step (I).

DETAILED DESCRIPTION OF THE INVENTION

The present invention relates to a two-step process wherein a phenolic resin is first reacted with an alkoxysilane (a) to form an alkoxysilane-modified phenolic resin. The alkoxysilane-modified phenolic resin, in turn, is then hydrolyzed and condensed by heating and stirring it in the presence of water to form the silicone resin-modified phenolic resin of the present invention.

With regard to the alkoxysilane comprising component (a) used as a starting material in the present invention, the group $R^1$ in the preceding formula represents monovalent substituted or unsubstituted hydrocarbon groups as exemplified by alkyl groups such as methyl, ethyl, propyl, and so forth; aryl groups such as phenyl, and so forth; and alkenyl groups such as vinyl, allyl, and so forth. $R^2$ represents a lower alkyl group as exemplified by methyl, ethyl, and propyl. This alkoxysilane is itself exemplified by methyltrimethoxysilane, methyltriethoxysilane, ethyltrimethoxysilane, phenyltrimethoxysilane, and vinyltrimethoxysilane.

The phenolic resin (b) used together with component (a) in the first process step (I) may be a novolac-type phenolic resin as obtained by the reaction of a phenol and an aldehyde in the presence of an acid catalyst, for example, as represented by the following general formula

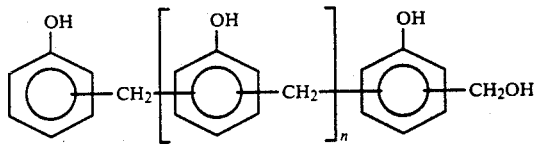

wherein n is less than about 10. Component (b) may also be a resole-type phenolic resin as obtained by their reaction in the presence of an alkaline catalyst. The former novolac phenolic resins are preferred within the context of the present invention.

In this process, the aforesaid alkoxysilane comprising component (a) and the phenolic resin comprising component (b) are condensation reacted with heating. At this point, the proportion between the alkoxysilane comprising component (a) and the phenolic resin comprising component (b) should be such that the ratio of the number of equivalents of alkoxy groups in component (a) to the number of equivalents of phenolic hydroxyl groups in component (b) is at least 1, and preferably 2 to 20.

This condensation reaction is suitably run as an alcohol-eliminating reaction at 100 degrees Centigrade to 170 degrees Centrigrade in the presence or absence of a condensation reaction catalyst. In order to obtain a very stable alcohol-eliminating reaction, it is advantageous to run the reaction under a reflux in the neighborhood of the boiling point of the particular alkoxysilane used. Moreover, the use of small quantities of a condensation reaction catalyst is also advantageous to the execution of the condensation reaction. Such condensation reaction catalysts are exemplified by acetic acid, trichloroacetic acid, tetrabutyl titanate, and so forth. Moreover, the progress of this reaction can be monitored based on the quantity of alcohol produced and the extent of the decline in phenolic hydroxyl groups in the phenolic resin.

In the subsequent process (II) of the present invention, water is added to the alkoxysilane-modified phenolic resin obtained from the preceding process (I), with heating and stirring, in order to carry out hydrolysis of the alkoxy groups in this phenolic resin together with a condensation reaction. This condensation reaction is suitably run, for example, as an alcohol-eliminating reaction at 100 to 170 degrees Centigrade, with or without a condensation reaction catalyst as described above, while dripping in water. It is advantageously executed directly after the aforesaid process (I). This reaction may be conducted as it stands with the eliminated alcohol remaining in the reaction system, or it may be run while removing this alcohol from the reaction system. While one to ten hours is generally sufficient, the progress of the reaction can be followed on the basis of the quantity of alcohol produced.

Because the silicone component in the resin thus obtained does not contain the diorganopolysiloxane unit, but rather is entirely composed of a resin structure, the silicone resin-modified phenolic resin prepared according to the method of the present invention has excellent heat resistance and excellent electrical insulating properties. It is therefore useful as a coating, binder, etc., for service in electrical and electronic components.

EXAMPLES

The present invention will be explained in greater detail through the following illustrative examples.

EXAMPLE 1

Seven hundred grams of methyltrimethoxysilane (15.4 alkoxy group equivalents) and 700 g novolac-type phenolic resin (BRG-558 from Showa Kobunshi Kabushiki Kaisha, Japan; melting point = 100 degrees Centigrade; 6.3 phenolic hydroxyl group equivalents) were introduced into a 2 liter four-neck flask equipped with a condenser and thermometer (number of equivalents of alkoxy groups/number of equivalents of phenolic hydroxyl groups = 2.4). Acetic acid (3.5 grams) was then introduced, the temperature was raised while stirring, and an alcohol-elimination reaction was run for 8 hours at the reflux temperature (110 to 103 Centrigrade). The product was a methyltrimethoxysilane-modified novolac-type phenolic resin. Ion-exchanged water (92.5 grams) was then added and an alcohol-elimination reaction was run for 5 hours at the reflux temperature. The reflux temperature here ultimately fell to 86 degrees Centigrade. The unreacted methyltrimethoxysilane and eliminated methanol were then distilled from the reaction system by heating the obtained reaction mixture. In this case, the temperature ultimately reached 120 degrees Centigrade. Analysis of the distillate showed a methanol to methyltrimethoxysilane ratio of 85:15. The reaction product obtained, amounting to 1,060 g, was a very thick, semi-solid fluid. Infrared absorption spectral analysis of the functional groups in this reaction product demonstrated that the quantity of phenolic hydroxyl groups had declined to almost one-half that introduced. Moreover, nuclear magnetic resonance spectral analysis showed that the molar ratio between Si—CH$_3$ methyl groups and SiOCH$_3$ methyl groups was almost 1:1. The obtained reaction product was soluble in polar solvents such as acetone and methanol. The viscosity of the compound, to which 10 weight percent methanol had been added, was 9,800 centipoise.

EXAMPLE 2

Twelve hundred grams of methyltrimethoxysilane (26.5 alkoxy group equivalents) and 400 g novolac-type phenolic resin (BRG-556 from Showa Kobunshi Kabushiki Kaisha; melting point = 80 degrees Centigrade; 3.5 phenolic hydroxyl group equivalents) were introduced into a 2 liter four-neck flask equipped with condenser and thermometer (number of equivalents of alkoxy groups/number of equivalents of phenolic hydroxyl groups = 7.6). Six grams of acetic acid was subsequently added, and a methyltrimethoxysilane-modified novolac-type phenolic resin was obtained by reaction for 12 hours while stirring at the reflux temperature. The reflux temperature ultimately reached 103 degrees Centigrade. Then, 11 g of ion-exchanged water was dripped in and a reaction was conducted for 5 hours at the reflux temperature, which fell from 103 degrees Centigrade to 72 degrees Centigrade. The eliminated methanol and unreacted methyltrimethoxysilane were distilled from the reaction system by heating the obtained reaction product to 150 degrees Centigrade. The resulting reaction product, obtained in a yield of 1,120 g, was a thick, transparent, reddish brown liquid.

I claim:

1. A process for preparing a silicone resin-modified phenolic resin comprising:

(I) reacting
(a) an alkoxysilane having the general formula

$$R^1Si(OR^2)_3$$

wherein R$^1$ is selected from the group consisting of a monovalent hydrocarbon group and a substituted monovalent hydrocarbon group and R$^2$ is an alkyl group having 1 to 3 carbon atoms, with (b) a novolac-type phenolic resin, to form an alkoxysilane-modified phenolic resin, the proportions being such that the ratio of the number of equivalents of alkoxy groups in component (a) to the number of equivalents of phenolic hydroxyl groups in component (b) is at least 1; and (II) heating and stirring a mixture comprising water and said alkoxysilane-modified novolac-type phenolic resin from step (I), said resin (b) having the general formula

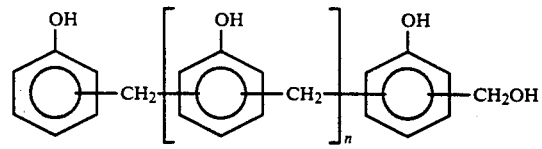

wherein n is less than about 10.

2. The process according to claim 1, wherein R$^1$ of said alkoxysilane (a) is selected from the group consisting of methyl, ethyl, propyl, phenyl, vinyl and allyl.

3. The process according to claim 2, wherein R$^2$ of said alkoxysilane (a) is methyl.

4. The process according to claim 3, wherein said alkoxysilane (a) is methyltrimethoxysilane.

5. The process according to claim 4, wherein the ratio of the number of equivalents of alkoxy groups in component (a) to the number of equivalents of phenolic hydroxyl groups in component (b) is 2 to 20.

* * * * *